UNITED STATES PATENT OFFICE.

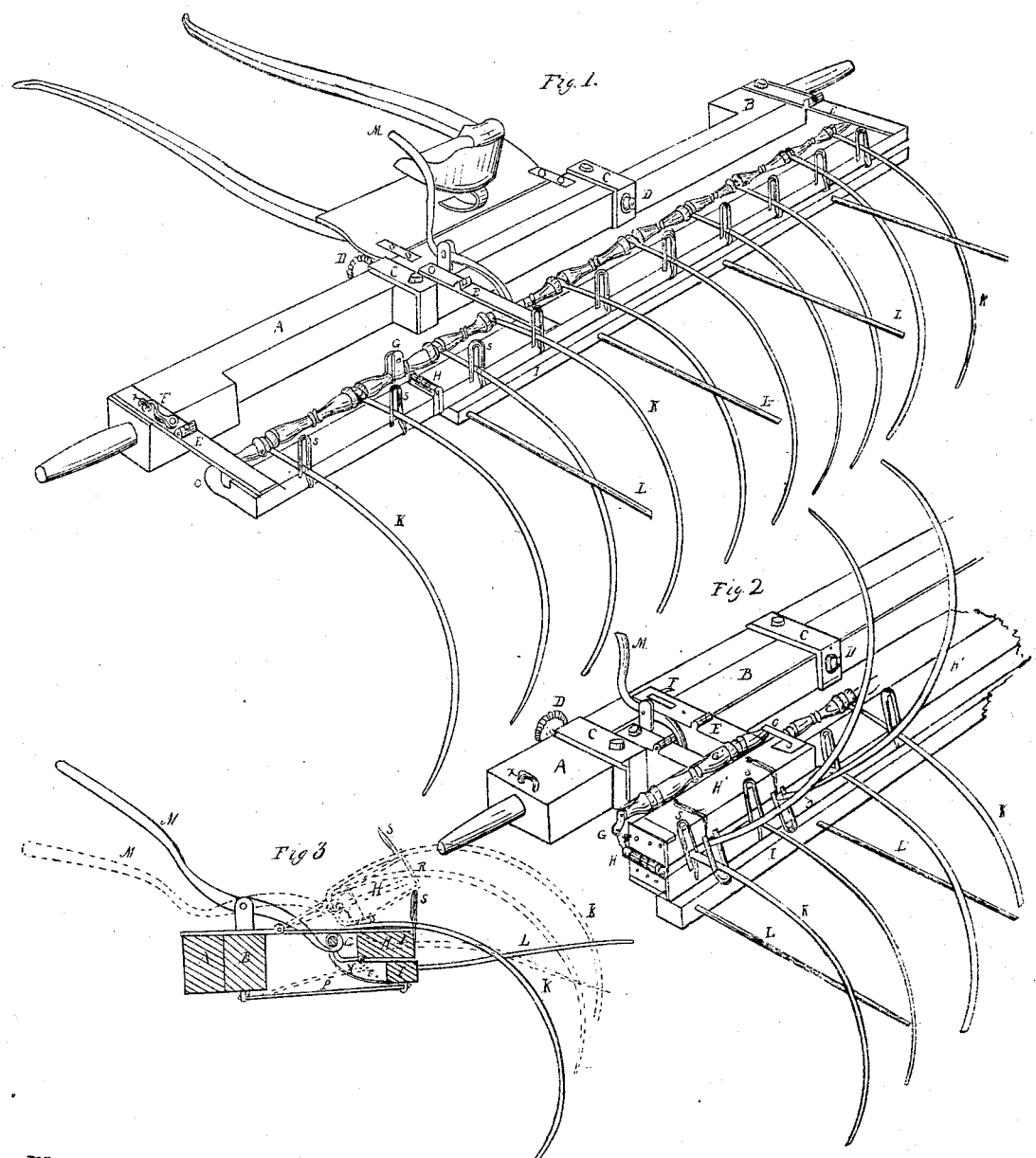

PHILIP LEBZELTER, OF LANCASTER, PENNSYLVANIA.

IMPROVEMENT IN HORSE-RAKES.

Specification forming part of Letters Patent No. 24,645, dated July 5, 1859.

*To all whom it may concern:*

Be it known that I, PHILIP LEBZELTER, of the city of Lancaster, in the county of Lancaster and State of Pennsylvania, have invented a new and useful Improvement on Horse-Rakes, by which a rake of the ordinary width of twelve feet is made convertible into one but eight feet wide, or less, to obviate the objection to wide rakes (so desirable in the field) by preventing the injury to them and inconvenience in narrow lanes or wooded roadsides, entering gateways, &c.; and I do hereby declare that the following is a full, clear, and exact description of the construction and operation of the same, reference being had to the annexed drawings, making a part of this specification, in which—

Figure 1 is a perspective view of the rake when extended for operation in the field. Fig. 2 shows one side folded over in part and the sliding axle pushed together. Fig. 3 illustrates the lever arrangement for emptying the rakes, more fully described as follows, viz:

The axle of the rake is made of two counter-shouldered pieces, A B, sliding in and embraced by the bands C, each piece having a band bolted to it, while the opposite side of the band is free for its adjoining piece to slide in. One or both of these bands have a binding-screw, D, for securing the adjustment. The spools to which the teeth are attached are on a rod hinged at G, and fastened at O to the supporting-beam of the teeth, with the guide-wires s over the teeth on top and a hook, t, beneath, around which and over each tooth a gum-elastic loop is fixed for springs. This beam is also hinged at H in a line with G, and supported by the hinged braces E E E. One (or both, if desired to fold on both sides) of the outer braces, E, is secured to the axle-head by a slot and hook, F, and staple X while extended. All that is required to reduce the rake in width is to unhook the brace E on the outer side or sides, when the hinged rod and beam G H will fold over onto the central parts of the same, and, relaxing the screw D, the light wheel is readily lifted and the pieces A B of the axle slid up against the shoulder of it counterpart. As shown by Fig. 2, the rail I, to which the cleaners L are attached, is connected to the axle beneath by the rod P, Fig. 3, and also to the rod G, and is necessarily shorter, as shown.

The advantages of this improvement are obvious, making an efficient machine in the field, embracing the useful qualities of a wide rake, and obviating its disadvantages.

I am aware that the several devices used in connection with my improvement are not new, and I do not claim such.

What I claim as my invention, and desire to secure by Letters Patent, is—

The double axle A B, brace and sliding bands C, hinged braces E, slot, hook, and staple F X, binding-screw D, hinged rod and beam G and H, when these parts are combined substantially in the manner and for the purpose specified.

PHILIP LEBZELTER.

Witnesses:
ZURIEL SWOPE,
JACOB STAUFFER.